(12) United States Patent
Park et al.

(10) Patent No.: US 8,398,130 B2
(45) Date of Patent: Mar. 19, 2013

(54) TRAY ANTI-OPENING APPARATUS

(75) Inventors: Jin Wan Park, Suwon-si (KR); Yong Gu Kang, Cheonan-si (KR); Chang Min Lee, Hwaseong-si (KR); Jong Sun Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 608 days.

(21) Appl. No.: 12/325,961

(22) Filed: Dec. 1, 2008

(65) Prior Publication Data

US 2009/0322103 A1 Dec. 31, 2009

(30) Foreign Application Priority Data

Jun. 30, 2008 (KR) .................. 10-2008-0062645

(51) Int. Cl.
*E05B 63/20* (2006.01)
(52) U.S. Cl. ........... 292/333; 292/DIG. 4; 292/DIG. 22; 296/37.12
(58) Field of Classification Search .................. 292/333, 292/332, 334–336, DIG. 4, DIG. 22, 65; 296/37.12, 37.8
See application file for complete search history.

(56) References Cited

U.S. PATENT DOCUMENTS

| 6,213,533 B1 | 4/2001 | Widulle et al. | |
| 6,808,214 B2 * | 10/2004 | Sato et al. | 292/341.15 |
| 7,481,468 B2 * | 1/2009 | Merideth et al. | 292/137 |
| 2002/0171251 A1 * | 11/2002 | Bieck et al. | 292/336.3 |
| 2007/0046037 A1 * | 3/2007 | Cho | 292/304 |
| 2009/0289092 A1 * | 11/2009 | Lee et al. | 224/483 |

FOREIGN PATENT DOCUMENTS

| DE | 41 30 847 C2 | 4/1995 |
| DE | 4427768 C1 | 11/1995 |
| DE | 691 20 749 T2 | 7/1996 |
| EP | 0 475 244 B1 | 7/1996 |
| JP | 2002-213135 A | 7/2002 |
| KR | 1020030055384 A | 7/2003 |
| KR | 100563730 B1 | 3/2006 |
| KR | 100645141 B1 | 11/2006 |
| KR | 1020070066775 A | 6/2007 |

* cited by examiner

*Primary Examiner* — Carlos Lugo
*Assistant Examiner* — Mark Williams
(74) *Attorney, Agent, or Firm* — Morgan, Lewis & Bockius LLP

(57) ABSTRACT

An anti-opening apparatus locks a tray so as to prevent the tray from opening when impact such as head impact is applied to a crash pad. In the tray anti-opening apparatus, the tray is mounted so as to be pulled into or out of a housing fixedly coupled to a crash pad. A rotary bar is hinged to the housing at an intermediate portion thereof, extends toward the tray on one side thereof, extends in a direction which crosses the extension direction of one side thereof on the other side thereof, and is rotated such that one side thereof approaches one surface of the tray when impact is applied to the crash pad. A pin is coupled on one side of the rotary bar, and a free end of the pin is inserted into an insertion hole formed in the tray when the rotary bar is rotated.

14 Claims, 5 Drawing Sheets

TRAY ANTI-OPENING APPARATUS

CROSS-REFERENCE TO RELATED APPLICATION

The present application claims priority to Korean Patent Application No. 10-2008-0062645 filed Jun. 30, 2008, the entire contents of which application is incorporated herein for all purposes by this reference.

BACKGROUND OF THE INVENTION

1. Field of the Invention

The present invention relates to a tray anti-opening apparatus, which prevents a tray from being opened by exterior impact so as to be able to meet the requirements of the interior compartment door.

2. Description of Related Art

As the use of a storage space in the interior of an automobile is increased, the application of trays capable of storing personal goods is gradually increased. Among these trays, an ash tray capable of containing cigarette ash and butts resulting from smoking, and a cup holder capable of holding a cup in which any liquid such as potable water is contained have been typically used.

Further, one of the trays which have recently been applied is an upper tray, which is mounted in the top face of a crash pad so as to enable a user to use it more conveniently, for instance, to store compact discs.

The upper tray mounted on the crash pad will be described in detail with reference to the attached drawings.

FIG. 1 is a front view illustrating a conventional upper tray mounted in a crash pad. The crash pad 10 is equipped with an instrument panel, a radio, an ashtray, air conditioner controls, and so on, and is provided with an upper tray capable of storing personal goods in a top face thereof.

Specifically, the crash pad 10 is provided with an openable tray door 20 on the top face of the middle thereof. Thus, when the goods are stored in or taken out from the upper tray, the tray door 20 is opened. When not in use, the tray door 20 is kept closed by a locking device.

FIG. 2 illustrates a typical position of the head of an occupant when a collision occurs. In the event of the collision, the head of an occupant who takes a driver seat or a passenger seat collides with the crash pad 10. At this time, the tray door, installed on an impact zone or its adjacent zone with which the head can collide, is opened by head impact.

In order to prevent such a phenomenon, the tray door has restrictions on an interior compartment door and a head impact area. In order to satisfy these restrictions, a knob formed on an outer face of the tray door should have an enough protrusion height. In the case in which the protrusion height of the knob is increased, the tray door has a poor external appearance, and the back of the hand of the user can be injured when the hand of the user is put into or out of the tray.

Particularly, in the case in which the knob for manipulating the locking device of the tray door is a push type, the tray door is very easily opened when the impact is applied to the crash pad 10.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide a tray anti-opening apparatus, which can lock a tray so as to prevent the tray from opening when impact such as head impact is applied to a crash pad without forming a separate knob on an outer face of the tray.

There is provided a tray anti-opening apparatus, in which a tray mounted so as to be pulled into or out of a housing fixedly coupled to a crash pad.

In an aspect of the present invention, the tray anti-opening apparatus may include a tray pulled into or out of a housing fixedly coupled to a crash pad, a rotary bar rotatable in a pitch or yaw motion, wherein a rotation center of the rotary bar is positioned at the housing to be balanced in a normal state with respect to the rotation center but pivotally rotated in an impact of a vehicle, and/or a pin, which is coupled on a first side of the rotary bar, and a free end of which is inserted into an insertion hole formed in the tray when the rotary bar is rotated in the pitch motion occurring in the impact of the vehicle.

A portion having the rotation center of the rotary bar may be rotatably coupled to the housing by a joint permitting the pitch or yaw motion for the rotary bar The insertion hole formed in the tray may be located at a position corresponding to the pin when the tray is substantially pushed into the housing.

A portion having the rotation center of the rotary bar may be positioned at a rear portion of the housing, at an intermediate portion in a width direction thereof, extending toward the tray on the first side thereof and extending opposite the tray on the second side thereof.

A portion having the rotation center of the rotary bar may be positioned at a rear portion of the housing, the rotary bar extends in a pull-out direction of the tray on the first side thereof and in a downward direction on the second side thereof and/or the free end of the pin protrudes in a downward direction. The rotary bar may include a weight on the second side thereof.

A portion having the rotation center of the rotary bar may be positioned at a rear portion of the housing, the rotary bar extends in a pull-out direction of the tray on the first side thereof and in a downward direction on the second side thereof, and/or wherein the free end of the pin protrudes in an upward direction. The insertion hole may be formed on an upper surface of the tray. The rotary bar may include a weight on the second side thereof.

The tray may further include a heart cam and a guide rail formed on the tray, the guide rail substantially enclosing the heart cam complementarily with a predetermined distance such that the pin moves in the yaw motion therebetween. The heart cam may include a recess including a local minima therein and the guide rail includes a local minima thereon. The local minima of the heart cam may be offset from the local minima of the guide rail in a predetermined distance. The insertion hole of the tray and the recess may be positioned co-axially.

The tray anti-opening apparatus may further include an elastic member, which applies an elastic force to the rotary bar in a direction in which the pin is drawn out of the insertion hole.

In another aspect of the present invention, a tray anti-opening apparatus may include a tray pulled into or out of a housing fixedly coupled to a crash pad, a rotary bar rotatable in a pitch or yaw motion, wherein a rotation center of the rotary bar is positioned at the housing to be balanced in a normal state with respect to the rotation center but pivotally rotated in an impact of a vehicle, and/or a pin, which is coupled on a first side of the rotary bar, and a free end of which is inserted into an insertion hole formed in the tray when the rotary bar is rotated in the pitch motion occurring in the impact of the vehicle, wherein the insertion hole formed in the tray is located at a position corresponding to the pin when the tray is substantially pushed into the housing, wherein the tray further includes a heart cam and a guide rail formed on the tray, the guide rail substantially enclosing the heart cam complementarily with a predetermined distance such that the pin moves in the yaw motion therebetween, wherein the heart cam includes a recess including a local minima therein and the guide rail includes a local minima thereon, and the local minima of the heart cam is offset from the local minima of the guide rail in a predetermined distance, and wherein the insertion hole of the tray and the recess are positioned co-axially.

According to various aspects of the present invention, the tray anti-opening apparatus can lock the tray so as to prevent the tray from opening when impact such as head impact is applied to the crash pad without forming a separate knob on an outer face of the tray, and be applied to a conventional push type tray without a change. Thus, the tray anti-opening apparatus has high applicability.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
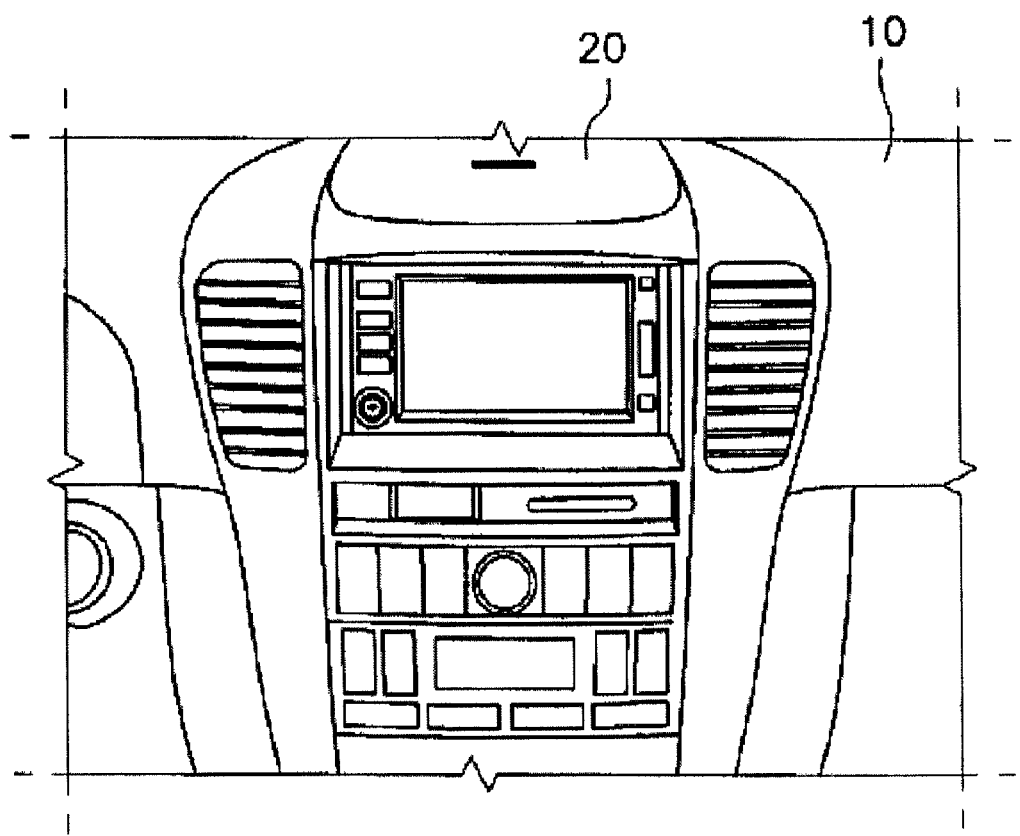
FIG. 1 is a front view illustrating an upper tray mounted in a crash pad.
Figure 2:
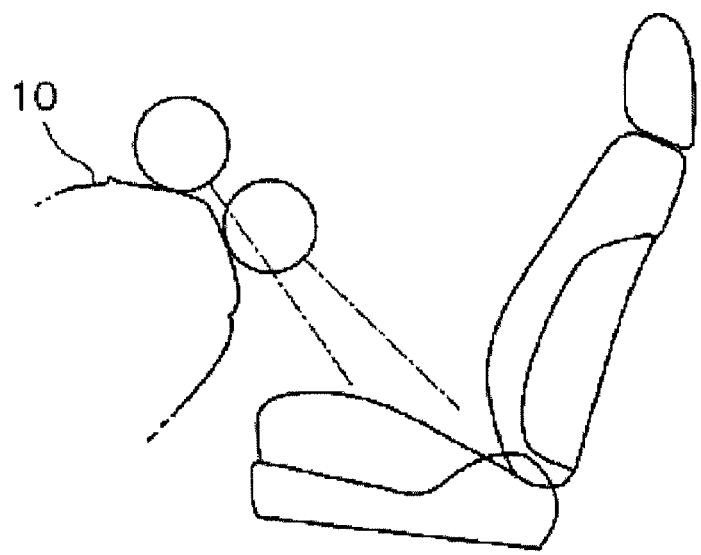
FIG. 2 illustrates a typical position of the head of an occupant when a collision occurs.
Figure 3:
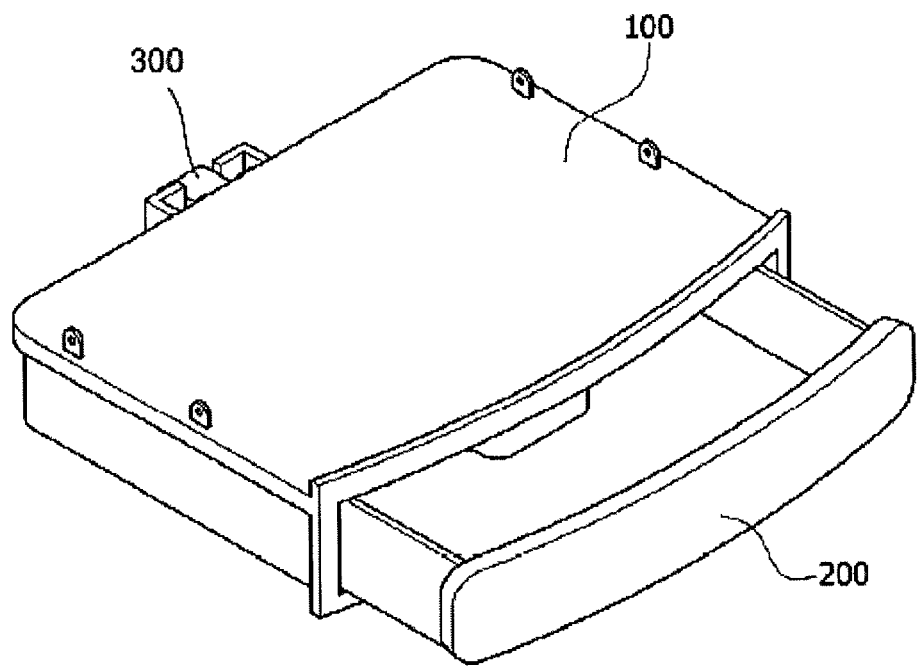
FIG. 3 is a perspective view illustrating a push type tray including an exemplary anti-opening apparatus according to the present invention.
Figure 4:
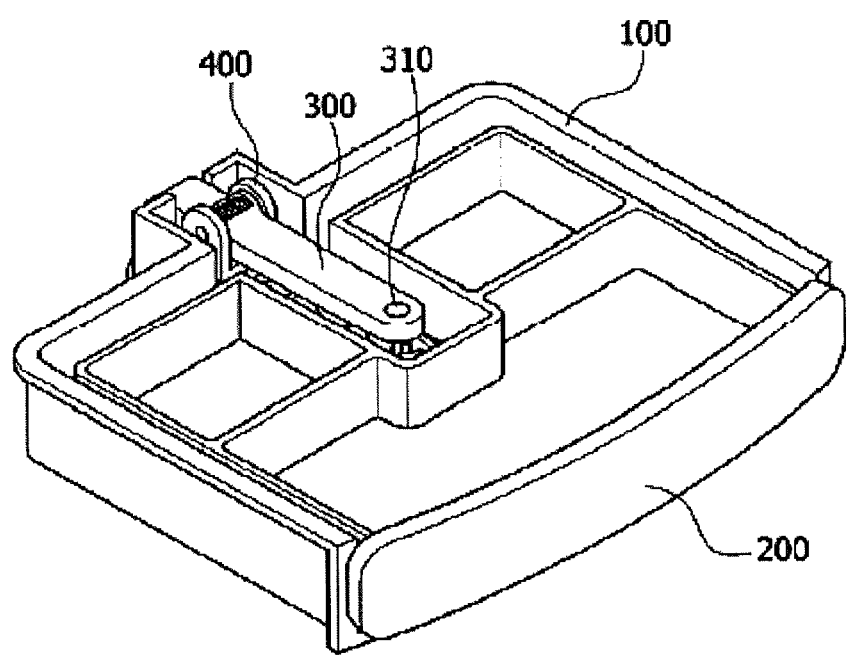
FIG. 4 is a cross-sectional perspective view illustrating an exemplary assembly of a housing and tray including an exemplary tray anti-opening apparatus according to the present invention.
Figure 5:
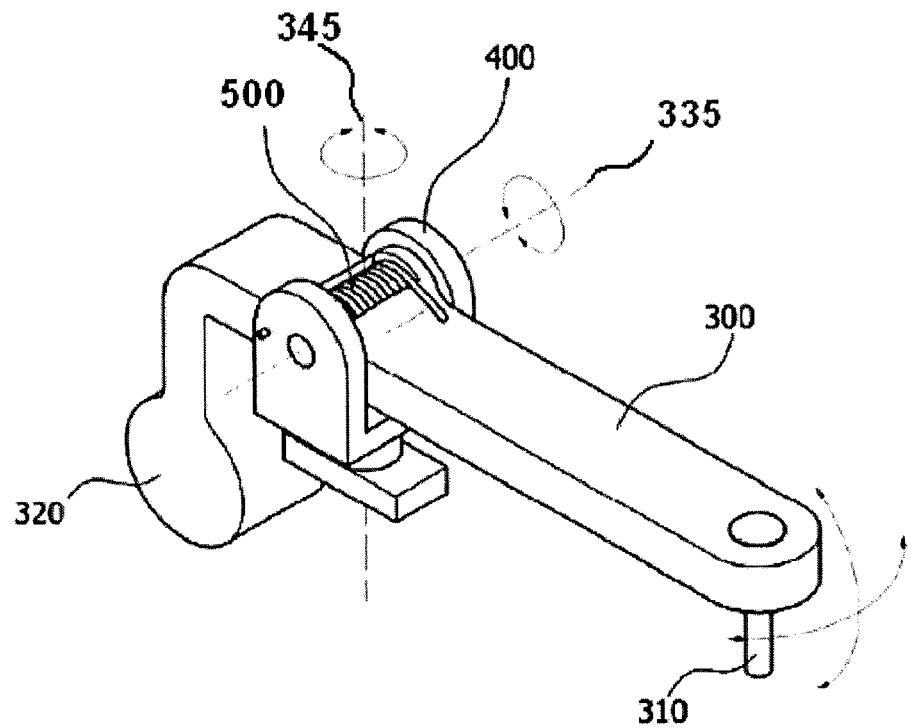
FIG. 5 is a perspective view illustrating the exemplary tray anti-opening apparatus according to the present invention.

FIG. 3 is a perspective view illustrating a push type tray including an exemplary anti-opening apparatus according to the present invention, FIG. 4 is a cross-sectional perspective view illustrating an assembly of a housing and a tray to which an exemplary tray anti-opening apparatus according to the present invention is applied, and FIG. 5 is a perspective view illustrating the exemplary tray anti-opening apparatus according to the present invention.

The tray anti-opening apparatus according to an exemplary embodiment of the present invention is a mechanism that prevents a tray 200, which is mounted so as to be pulled into or out of a housing 100 fixedly coupled to a crash pad, from opening during an impact of the vehicle. To this end, the tray anti-opening apparatus includes a rotary bar 300 rotatably coupled to the housing 100 at the rear end of the tray 200, and a pin 310 coupled on one side of the rotary bar 300, particularly, which extends toward the tray 200.

The other end of the rotary bar 300 is coupled to the housing 100 by a joint 400 at an intermediate portion thereof in the width direction so as to rotate up and down (pitch motion) with respect to a first rotation axis 335 or left and right (yaw motion) with respect to a second rotation axis 345. Further, the rotary bar 300 extends toward the tray 200 (in this embodiment, in a pull-out direction of the tray 200) on one side thereof, and extends in the direction which crosses the extension direction of one side thereof (in this embodiment, in a downward direction) on the other side thereof as shown in FIG. 5. At this time, a weight 320 having a predetermined magnitude of weight is formed on the other side of the rotary bar 300, which extends in the downward direction. Further, the pin 310 coupled to one side of the rotary bar 300 has a free end protruding toward the bottom surface of the tray 200.

The tray 200 is provided with an insertion hole 230 on the bottom surface of the tray 200 at a position corresponding to the free end of the pin 310 when the tray 200 is completely pulled into the housing 100 (see FIGS. 6 through 9). When the rotary bar 300 pivots such that one side thereof rotates in a downward direction, the pin 310 is inserted into the insertion hole 230 with pitch movement.

Effects obtained by the insertion of the pin 310 into the insertion hole 230 will be described in detail with reference to FIGS. 6 through 9.

Figure 6:
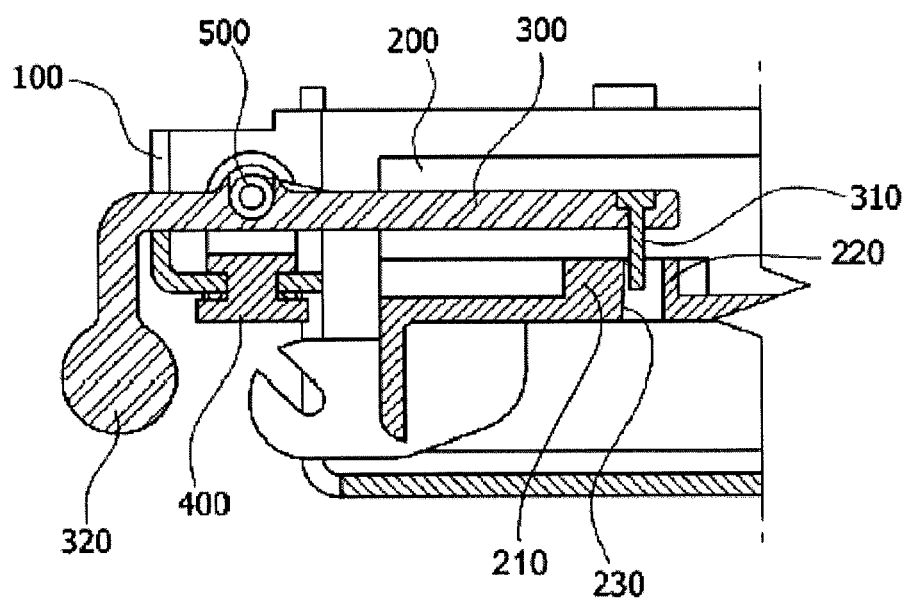
FIGS. 6 and 7 illustrate the configuration of the exemplary tray anti-opening apparatus of the present invention and the position of a pin when no exterior impact is applied.
Figure 7:
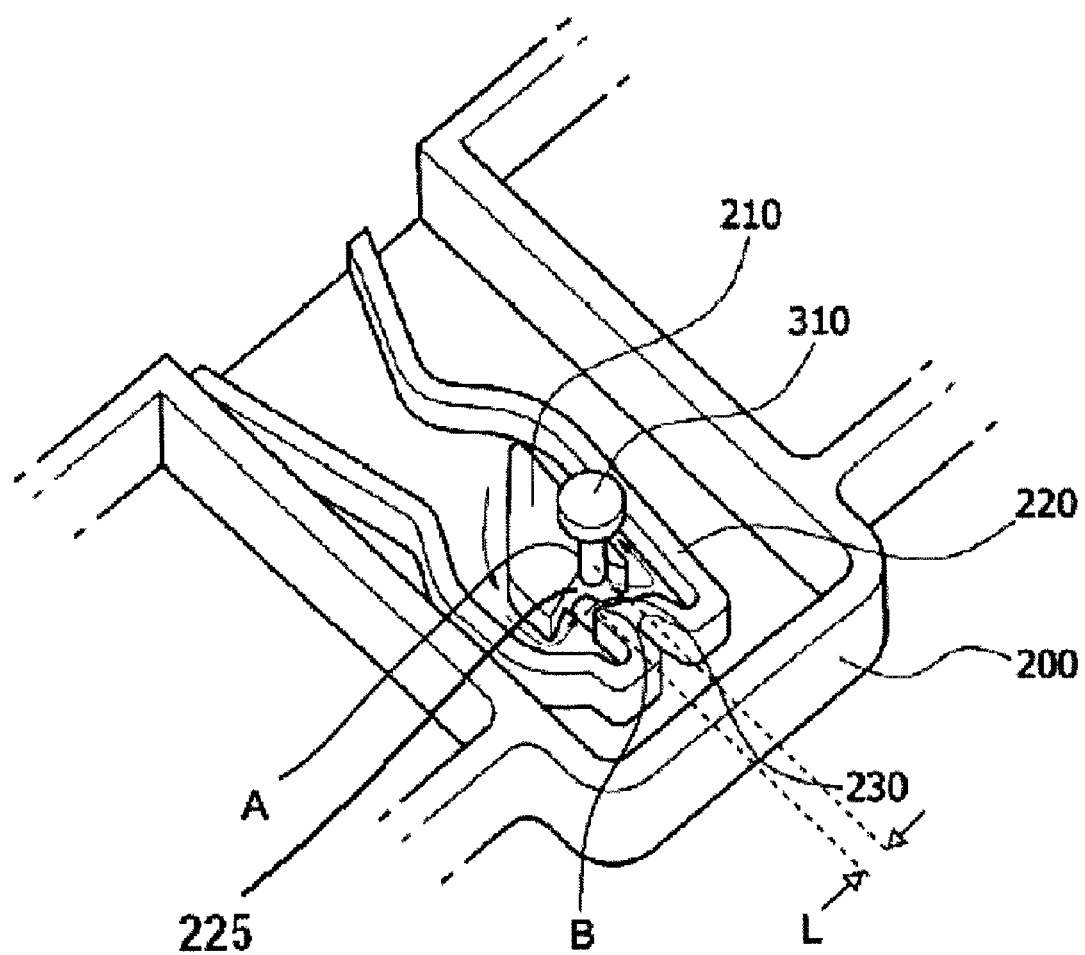
Figure 8:
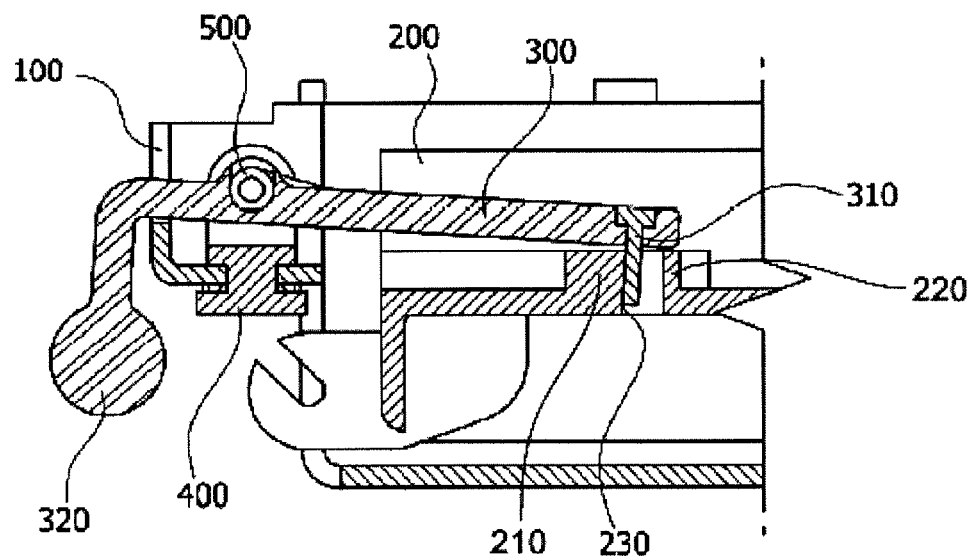
FIGS. 8 and 9 illustrate the operation of the exemplary tray anti-opening apparatus of the present invention and the position of a pin when exterior impact is applied.
Figure 9:
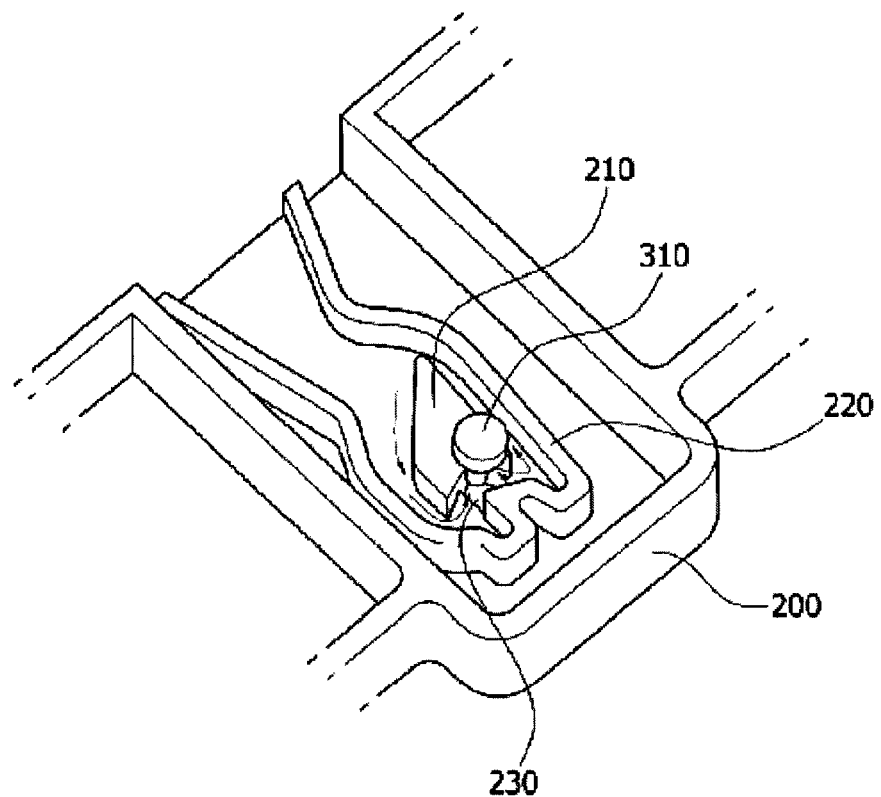

FIGS. 6 and 7 illustrate the configuration of the tray anti-opening apparatus of the present invention and the position of the pin 310 when no exterior impact is applied, and FIGS. 8 and 9 illustrate the operation of the tray anti-opening apparatus of the present invention and the position of the pin 310 when exterior impact is applied.

As illustrated in FIGS. 6 and 7, the rotary bar 300, which constitutes the tray anti-opening apparatus of the present invention, is configured so that the pin 310 is kept drawn out of the insertion hole 230 ordinarily when no exterior impact is applied.

The tray 200 includes a heart cam 210 and a guide rail 220. The pin 310 moves along a path formed between an outer circumference of the heart cam 210 and the guide rail 220, thereby locking and unlocking the tray 200 as explained hereinafter.

The heart cam 210 comprising a recess including a local minima "A" and the guide rail 220 includes a local minima "B," and the guide rail 220 encloses complementarily the recess of the heart cam 210 with a predetermined distance. The local minima "A" and the local minima "B" are offset each other with a predetermined distance "l" as shown in FIG. 7.

As illustrated in FIG. 7, in the case in which the pin 310 is located in the recess of the heart cam 210 but not in the insertion hole 230, the heart cam 210 interferes with the pin 310 when an attempt is made to pull out the tray 200, so that the tray 200 is locked so as not to come out of the housing 100. In contrast, when a user further pushes the tray 200 into the housing 100, the local minima "B" of the guide rail 220 pushes the pin 310 and the pin 310 comes to follow outer circumference of the heart cam 210 in the arrow direction since the local minima "A" and the local minima "B" are offset to bias the pin in the arrow direction when the pin 310 is pushed by the guide rail 220. After the pin 310 moves around one half of the heart cam 210 in an arrow direction of FIG. 7, the heart cam 210 does not interfere with the pin 310 although an attempt is made to withdraw the tray 200, so that the tray 200 is unlocked. Thus, in the state illustrated in FIG. 6 or 7, a user pushes the tray 200 to the housing 100, thereby enabling the tray 200 to move inwards and outwards.

In this manner, the structure in which the tray 200 is opened and closed in the push fashion using the heart cam 210, the guide rail 220, and the pin 310 is widely used in various fields in addition to the tray 200, and so a detailed description thereof will be omitted.

In the state illustrated in FIG. 6 or 7, when impact is applied to the crash pad to which the housing 100 is mounted, the tray 200 that is not directly coupled to the crash pad is not pushed forwards, but the housing 100 coupled to the crash pad is pushed forwards together with the crash pad in the impact.

At this time, the housing 100 is pushed forwards only by amounts of elastic deformation of the crash pad and the housing 100 caused by the applied impact, but the weight 320 provided on the other side (left-hand side of FIG. 6) of the rotary bar 300 shows a tendency to further move forwards by means of inertia. In this manner, the rotary bar 300 rotates in a direction in which the weight 320 moves away from the housing 100, i.e. in a clockwise direction, as illustrated in FIG. 8. Thus, the pin 310 is inserted into the insertion hole 230 of the tray 200.

In the case in which the insertion hole 230 is not formed in the tray 200, the pin 310 may deviate from the recess of the heart cam 210 by the guide rail 220 when exterior impact is applied in the state illustrated in FIG. 6 or 7. Thus, the tray 200 has a possibility of coming out of the housing 100.

However, as illustrated in FIGS. 8 and 9, in the case in which the insertion hole 230 is formed substantially near to the recess 225 of the heart cam 210 in the tray 200, the pin 310 is inserted into the insertion hole 230 when exterior impact is applied, so that the pin 310 does not deviate from the recess of the heart cam 210. Thus, the tray 200 is kept pulled into the housing 100 during the impact.

According to the tray anti-opening apparatus of the present invention, the tray 200 is not pulled to the outside although the impact such as head impact is applied to the crash pad, so that the tray anti-opening apparatus can meet the requirements of the interior compartment door.

Further, the tray anti-opening apparatus further includes an elastic member 500, which applies an elastic force to the rotary bar 300 in a direction in which the pin 310 is drawn out of the insertion hole 230, i.e., in the counterclockwise direction in FIG. 6. Thus, in the state illustrated in FIG. 8 or 9, when the force of inertia applied to the weight 320 is reduced, the rotary bar 300 is rotated in a counterclockwise direction by the elastic member 500, and thus returns to the balanced state illustrated in FIG. 6 or 7.

In an exemplary embodiment of the present invention, the weight 320 can be eliminated. For example, in the case in which the other side of the rotary bar 300 is configured to have sufficient mass, the rotary bar 300 can be rotated by the inertia force applied to the other side of the rotary bar 300 when the impact is applied to the crash pad, and thus the pin 310 is inserted into the insertion hole 230.

Up to now, this embodiment has been described regarding the configuration in which one side of the rotary bar 300 is shaped so as to extend in the pull-out direction of the tray 200. However, the one side of the rotary bar 300 may extend so as to be slightly inclined with respect to the pull-out direction of the tray 200. This configuration can produce a substantially same effect as in this embodiment. Thus, the extension direction of one side of the rotary bar 300 can be appropriately adjusted according to various design requirements.

Alternatively, the other side of the rotary bar 300 may extend in an upward direction, and the pin 310 may protrude in an upward direction. Further, the insertion hole 230 may be formed in the top surface of the tray 200. Even in this case, the pin 310 can be inserted into the insertion hole 230 by the inertia force of the weight 320. However, in the case in which the weight 320 is located above the rotary bar 300, the rotary bar 300 may be rotated by weight of the weight 320 itself, although the impact is not applied to the crash pad, and thus the pin 310 may be inserted into the insertion hole 230 even in small external force. For this reason, the extension direction of the rotary bar 300 and the protrusion direction of the pin 310 are preferably set so as to be directed in a downward direction, as described in this embodiment.

For convenience in explanation and accurate definition in the appended claims, the terms "upper", "front" or "rear", "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A tray anti-opening apparatus comprising:
    a housing adapted to be fixedly coupled to a crash pad;
    a tray retractably received in the housing;
    a rotary bar hingedly coupled to the housing to be rotatable in a vertical pitch direction and in a horizontal yaw direction with respect to the tray, wherein the rotary bar is rotated in the vertical pitch direction upon impact when an impact force is applied to a vehicle; and
    a pin coupled on an one end of the rotary bar, wherein an end of the pin is selectively inserted into an insertion hole formed in the vertical direction in the tray when the rotary bar is rotated in the vertical pitch direction by the impact force applied to the vehicle,
    wherein the rotary bar is rotatably coupled to the housing by a joint having a first rotational axis and a second rotational axis such that the rotary bar is rotatable about the first rotational axis in the horizontal yaw direction and about the second rotational axis in the vertical pitch direction; and
    wherein the rotary bar includes a weight on the other end thereof.

2. The tray anti-opening apparatus according to claim 1, wherein the insertion hole formed in the tray is located adjacent to a recess of a heart cam formed to the tray.

3. The tray anti-opening apparatus according to claim 1, wherein the rotary bar is pivotally positioned at a rear portion of the housing, at an intermediate portion in a width direction thereof, extending toward the tray on the one end thereof and extending opposite the tray on the other end thereof.

4. The tray anti-opening apparatus according to claim 1, wherein
the rotary bar is pivotally positioned at a rear portion of the housing, the rotary bar extends in a pull-out direction of the tray on the one end thereof and in a downward direction on the other end thereof; and
the end of the pin protrudes in a downward direction.

5. The tray anti-opening apparatus according to claim 1, wherein:
the rotary bar is pivotally positioned at a rear portion of the housing, the rotary bar extends in a pull-out direction of the tray on the one end thereof and in a downward direction on the other end thereof; and
wherein the end of the pin protrudes in an upward direction.

6. The tray anti-opening apparatus according to claim 5, wherein the insertion hole is formed on an upper surface of the tray.

7. The tray anti-opening apparatus according to claim 1, wherein the tray further comprises:
a heart cam and a guide rail formed on the tray, the guide rail substantially enclosing the heart cam complementarily with a predetermined distance such that the pin moves in the horizontal yaw direction therebetween.

8. The tray anti-opening apparatus according to claim 7, wherein the heart cam comprises a recess including a local minima therein and the guide rail includes a local minima thereon.

9. The tray anti-opening apparatus according to claim 8, wherein the local minima of the heart cam is offset from the local minima of the guide rail in a predetermined distance.

10. The tray anti-opening apparatus according to claim 8, wherein the insertion hole of the tray and the recess are formed in a vertical direction on the tray.

11. The tray anti-opening apparatus according to claim 1, further comprising an elastic member, which applies an elastic force to the rotary bar in a direction in which the pin is drawn out of the insertion hole.

12. A passenger vehicle comprising the tray anti-opening apparatus of claim 1.

13. A tray anti-opening apparatus comprising:
a housing adapted to be fixedly coupled to a crash pad;
a tray retractably received in the housing;
a rotary bar hingedly coupled to the housing by a joint having a first rotation axis and a second rotation axis, wherein the rotary bar is rotatable in a horizontal yaw direction about the first rotation axis and in a vertical pitch direction about the second rotation axis and wherein the rotary bar is rotated in the vertical direction in when an impact force is applied to a vehicle; and
a pin coupled on an one end of the rotary bar, wherein an end of the pin is selectively inserted into an insertion hole formed in the tray when the rotary bar is rotated in the vertical direction by the impact force applied to the vehicle,
wherein the insertion hole formed in the vertical direction in the tray is located adjacent to a recess of a heart cam formed to the tray,
wherein the tray further comprises a guide rail formed on the tray, the guide rail substantially enclosing the heart cam complementarily with a predetermined distance such that the pin moves in the horizontal direction therebetween,
wherein the heart cam comprises the recess including a local minima therein and the guide rail includes a local minima thereon, and the local minima of the heart cam is offset from the local minima of the guide rail in a predetermined distance,
wherein the insertion hole of the tray and the recess are formed in the vertical direction on the tray, and
wherein the rotary bar includes a weight on the other end thereof.

14. A passenger vehicle comprising the tray anti-opening apparatus of claim 13.

* * * * *